No. 874,412. PATENTED DEC. 24, 1907.
W. H. LEWIS.
FOLDING POCKET COAT AND HAT HOOK.
APPLICATION FILED JUNE 10, 1907.
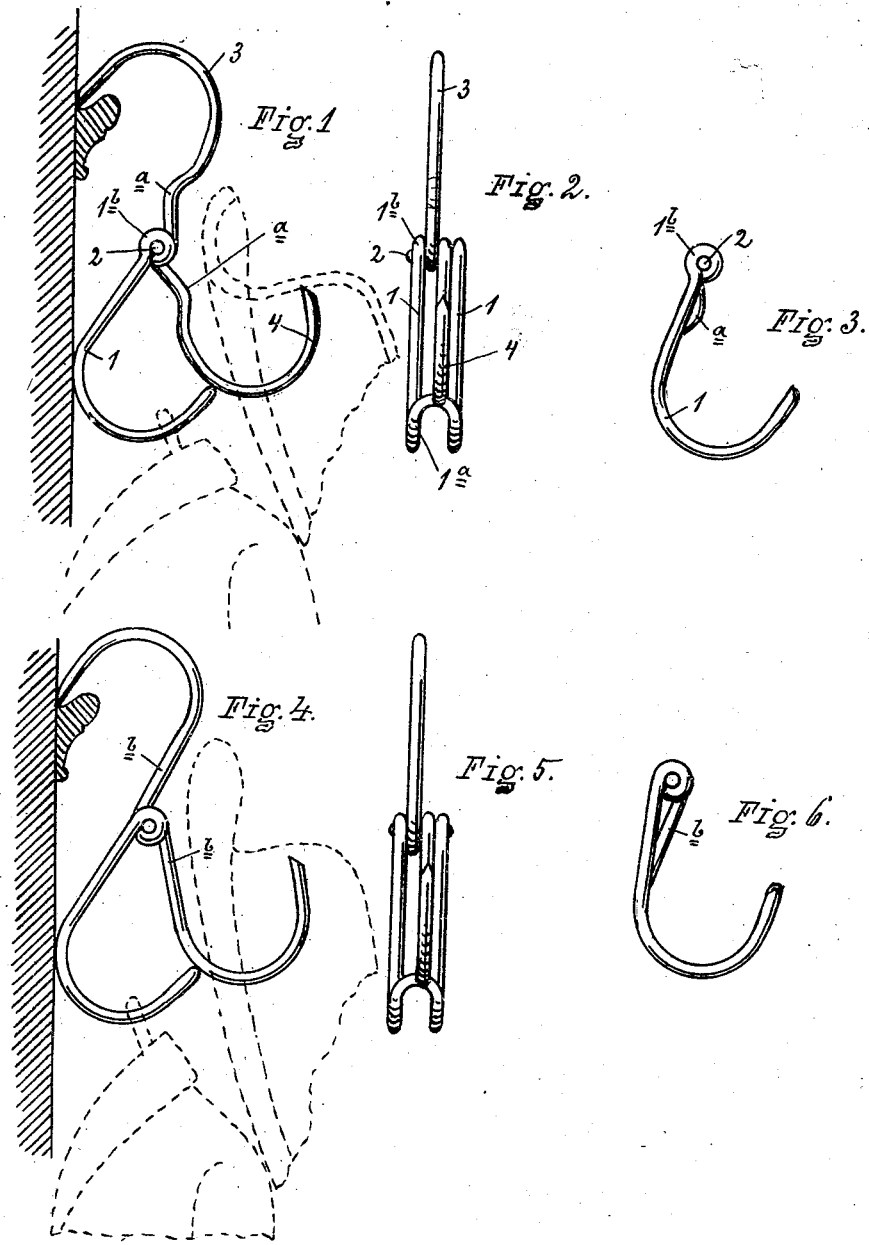
WITNESSES
Rich. A. George
Sarah E. Clark
INVENTOR
WILLIAM H. LEWIS.
By Robinson, Martin & Jones
ATTORNEYS.

UNITED STATES PATENT OFFICE.

WILLIAM H. LEWIS, OF ROME, NEW YORK.

FOLDING POCKET COAT AND HAT HOOK.

No. 874,412.

Specification of Letters Patent.

Patented Dec. 24, 1907.

Application filed June 10, 1907. Serial No. 378,102.

*To all whom it may concern:*

Be it known that I, WILLIAM H. LEWIS, of Rome, in the county of Oneida and State of New York, have invented certain new and useful Improvements in Folding Pocket Coat and Hat Hooks; and I do hereby declare that the following is a full, clear, and exact description thereof, which will enable others skilled in the art to which it appertains to make and use the same, reference being had to the accompanying drawings, and to the letters of reference marked thereon, which form part of this specification.

My invention relates to an improved form of folding pocket coat and hat hook, which is simple in construction, cheaply made, neat, and unobjectionable in its folded position for a pocket piece, easily and conveniently manipulated, and complete and efficient in use.

Figure 1 shows a side elevation of the device in open position and in use. Fig. 2 shows a front elevation of the same. Fig. 3 shows a side elevation in folded position. Fig. 4 shows a slightly modified form of construction in a similar manner to that shown in Fig. 1. Fig. 5 shows an edge view of the device shown in Fig. 4 in open position. Fig. 6 shows a side elevation of the device shown in Figs. 4 and 5 in folded or closed position.

Referring to the reference letters and figures in a more particular description, 1 indicates a double or two-part hook, the parts of which are spaced apart and connected at the point of the hook by a bow or loop $1^a$. The part 1 is provided on the opposite end from the loop $1^a$ with eyes $1^b$ which receive the pivot 2. Upon this pivot are hinged two independent swinging hooks 3 and 4. Both hooks 3 and 4 are substantially of the form of the double hook 1 and located between the parts thereof and adapted to fold within the hook 1 as shown in Fig. 3. The hooks 3 and 4 are each provided adjacent to the pivot with a bend forming an inwardly extending projection $a$ adapted to be pressed upon by the user to displace the two hooks 3 and 4 from their folded position within the double hook 1. In open position the hooks 3 and 4 may indifferently take the position shown in Figs. 1 and 2, in which case one hook, as 3, becomes the suspending hook and may be engaged with a shelf, molding, projection or any other suitable support for the whole device.

The coat may be supported on the double hook 1, while the hat may be readily secured on the other hook, as 4, which is supported somewhat in a lateral position by resting on the point of the double hook 1.

The construction shown in Figs. 4, 5 and 6 differs from that shown in the previously numbered figures, by omitting the projection $a$ from the hooks 3 and 4 and substituting therefor the form of shank shown and indicated at $b$. In the double hook the eyes are turned in one direction around the pivot, while in the independent single hooks the eyes are turned in the opposite direction from the shank, whereby the arrangement shown in Figs. 4, 5 and 6 is secured. The operator can displace the inner hooks by bearing on the shank at $b$, although I do not consider this construction as desirable as the previously described one.

It is evident that other modifications and changes may be made without departing from the invention covered by the claims.

What I claim as new and desire to secure by Letters Patent is:

The combination in a device of the character described, of the double outside hook, an inside hook pivoted to and adapted to fold between the parts of the outside hook and provided with a projection $a$ for displacing same from folded position, substantially as set forth.

In witness whereof, I have affixed my signature, in presence of two witnesses, this 4th day of June 1907.

WILLIAM H. LEWIS.

Witnesses:
R. J. NOONAN,
A. L. NOONAN.